United States Patent [19]
Bishaf et al.

[11] Patent Number: 5,330,215
[45] Date of Patent: Jul. 19, 1994

[54] CENTER-MOUNTED PASSENGER SEAT FOR BICYCLE

[75] Inventors: Morrie Bishaf; John Faulhaber, both of Gurnee, Ill.

[73] Assignee: All American Products, Inc., Gurnee, Ill.

[21] Appl. No.: 10,262

[22] Filed: Jan. 28, 1993

[51] Int. Cl.$^5$ .............................................. B62J 1/28
[52] U.S. Cl. ..................................... 280/202; 297/243
[58] Field of Search .................... 280/202, 288.4, 291; 297/243

[56] References Cited

U.S. PATENT DOCUMENTS

| | | | |
|---|---|---|---|
| 453,212 | 6/1891 | Sager | 297/129 |
| 479,845 | 8/1892 | Sager | 280/202 |
| 579,514 | 3/1897 | Collins | 248/628 |
| 1,474,577 | 11/1923 | Bobbitt | 280/282 |
| 2,234,299 | 3/1941 | Christy | 280/202 |
| 2,448,867 | 9/1948 | Darden | 280/202 |
| 3,902,737 | 9/1975 | Berger et al. | 280/202 |
| 4,305,532 | 12/1981 | Reminger | 224/31 |
| 4,632,453 | 12/1986 | Robbin et al. | 297/243 |
| 4,919,479 | 4/1990 | Loewke et al. | 297/195 |

FOREIGN PATENT DOCUMENTS 364922 1/1932 United Kingdom ................ 280/202

*Primary Examiner*—David M. Mitchell
*Assistant Examiner*—Andrew C. Pike

[57] ABSTRACT

A center-mounted passenger seat for mounting on either a men's or women's style adult bicycle in which the passenger is situated between the saddle and handlebars of the adult bicycle. The passenger seat comprises a seat for carrying the passenger and a supporting bracket attached to the seat. The supporting bracket is engaged with both the seat tube and the top tube of the bicycle.

6 Claims, 3 Drawing Sheets

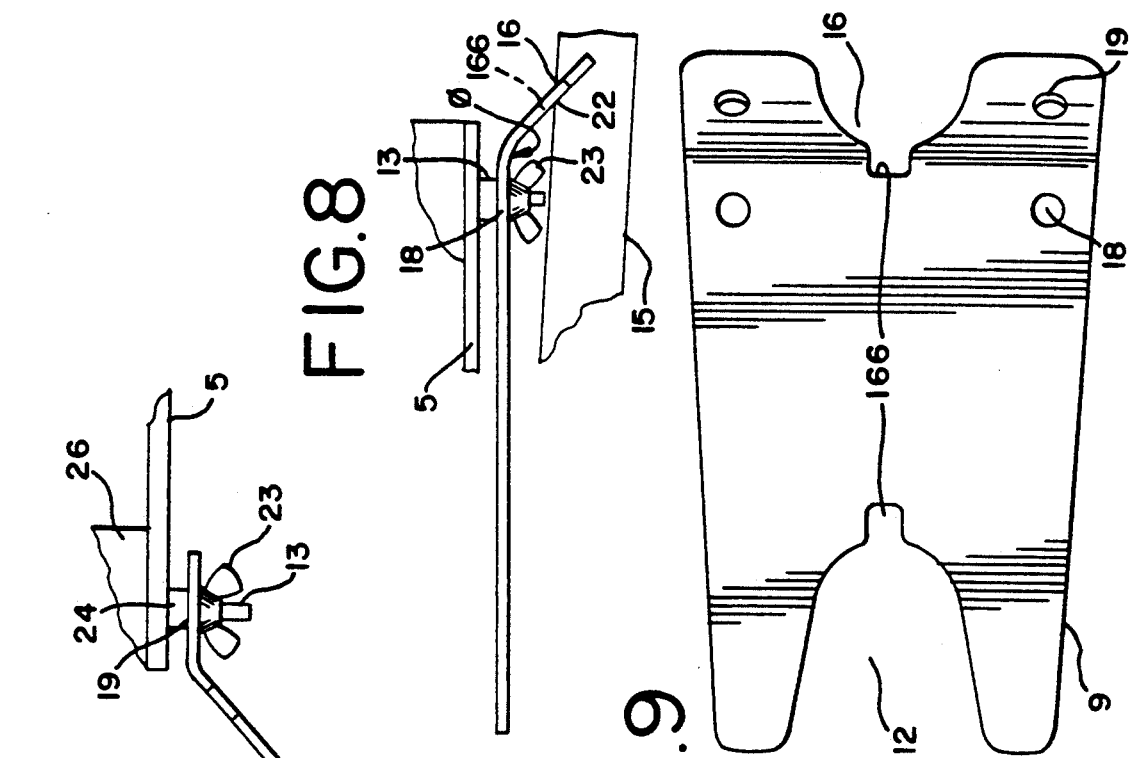
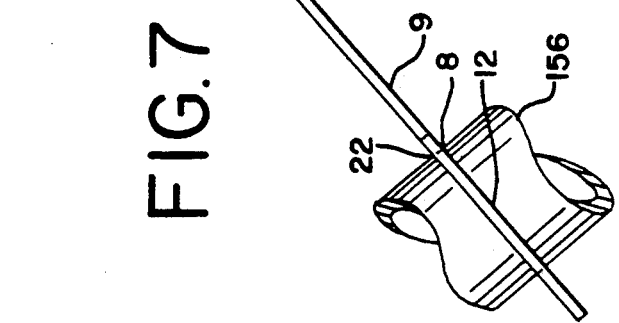
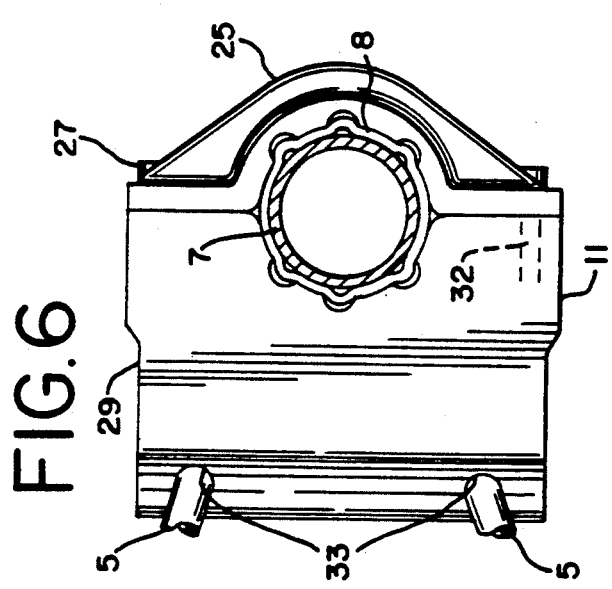
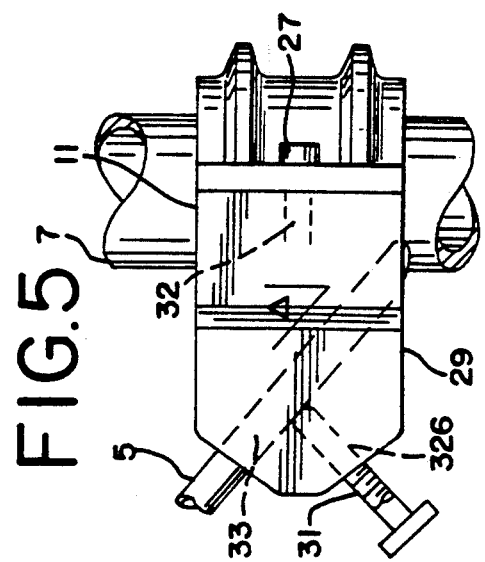

5,330,215

CENTER-MOUNTED PASSENGER SEAT FOR BICYCLE

BACKGROUND OF THE INVENTION

1. Field of the Invention

This invention relates generally to an arrangement for mounting a passenger seat on an adult bicycle in which the passenger seat is situated between the saddle and handlebars of the adult bicycle. The center-mounted passenger seat for bicycle is adjustable in angle and height, can be used interchangeably on most sizes and styles of adult bicycles, and is readily removable. It also can be used as a stationary child seat after removal from the adult bicycle.

2. Description of the Prior Art

The idea of carrying a passenger, often a child, in a seat attached to an adult bicycle is known in the art. Currently, the most frequently seen configuration is one in which the passenger seat is mounted either in front of the handlebars or behind the saddle of the adult bicycle. However, placing the passenger seat in either of these locations substantially alters the center of gravity of the bicycle. This makes the bicycle less stable and more difficult to operate. Additionally, if the passenger is a young child and the adult must place him into the passenger seat, it is more difficult for an adult acting alone to place the child into the passenger seat and then mount the bicycle when the seat is mounted in either of these positions, unless the bicycle is somehow rigidly supported by extrinsic means.

For these reasons, the present invention mounts the passenger seat between the saddle and the handlebars of the adult bicycle, with engagement with the bicycle frame at the seat tube and top tube of the adult bicycle. Passenger seats mounted between the saddle and handlebars of an adult bicycle ("center-mounted passenger seats") have been suggested previously in the art. See, for example, Sager, U.S. Pat. No. 479,845; Sager, U.S. Pat. No. 453,212; Loewke et al., U.S. Pat. No. 4,919,479; Bobbitt, U.S. Pat. No. 1,474,577; Christy, U.S. Pat. No. 2,234,299; Collins, U.S. Pat. No. 579,514; Reminger, U.S. Pat. No. 4,305,532; Robbin et. al., U.S. Pat. No. 4,632,453; Berger et al., U.S. Pat. No. 3,902,737; Darden, U.S. Pat. No. 2,448,867; and Mangan, British Patent No. 364,922. However, the prior art fails to disclose the structure of the center-mounted passenger seat for bicycle described and claimed herein, and therefore fails to achieve the advantages associated with the present invention. No prior art center-mounted passenger seat discloses engagement points at both the seat tube and the top tube of the adult bicycle, instead either (1) utilizing only one engagement point, at either the seat tube or the top tube of the adult bicycle; (2) utilizing engagement points at the top tube and at the saddle post itself, above its entry into the seat tube; or (3) utilizing engagement points at the top tube and the down tube of the adult bicycle.

The present invention, by using engagement points at both the seat tube and the top tube, combined with adjustable securing means at both points and a supporting bracket between the two points comprising a plurality of braces, can be used on most sizes and types of bicycles, and can be quickly and easily switched from a men's to a women's style bicycle. Although the distinction between men's and women's style bicycles is less obvious on some current bicycle models than it was at one time, a men's style bicycle generally is considered as one having a substantially horizontal top tube, with the top tube connecting the seat tube and the head tube. A women's style bicycle, on the other hand, is generally considered as one that has a top tube which slants towards the ground from the head tube to a connection at some point along the seat tube. The present invention also is readily adjustable to a variety of heights and angles on the adult bicycle, rather than a single position, allowing the rider to adjust the center-mounted passenger seat easily to the most desirable or comfortable position for both the rider and the passenger.

The adaptability of the present invention is achieved by the fact that, in the preferred embodiment, the forward part of the supporting bracket includes an angled forward support plate that defines separate cutouts for use with men's and women's style bicycles. The after part of the supporting bracket comprises an aft supporting member that includes a plurality of braces which may be rail-like members, as opposed to being a solid body, at least one of which passes to one side of a substantially vertical imaginary plane simultaneously intersecting the head, top, and seat tubes of a men's or women's bicycle, and at least one of which passes to the other side of the same imaginary vertical plane. These rail-like members allow use of the center-mounted passenger seat for bicycle on both men's and women's style bicycles, provide for easy height and angle adjustment, and provide increased seat stability.

By using the seat tube and the top tube as the primary engagement points, the present invention offers other distinct advantages. First, the center-mounted passenger seat is significantly more stable than prior art center-mounted passenger seats. Center-mounted passenger seats mounted solely along the top tube tend to sway and rock, as do center-mounted passenger seats mounted solely to the seat tube, with no forward engagement point. The plurality of rail-like members used in the present invention likewise adds to the stability of the passenger seat by decreasing sway, pitching from side to side, and yaw. This stability is furthered by constructing the rail-like members with shock-absorbing bends in two different directions. In the preferred embodiment, one bend is in a direction normal to an imaginary vertical plane bisecting the saddle of the bicycle. The other is in a direction substantially normal to an imaginary plane substantially parallel to the horizontal support member of the passenger seat. Center-mounted passenger seats utilizing top tube and saddle post engagement points preclude the wide variety of angle and height adjustments available in the present invention.

Another significant advantage of the present invention is that the passenger seat of the present invention can be removed easily from the bicycle. Ease of removal often is a highly desirable attribute in products used in conjunction with bicycles (e.g., quick-release wheels, quick-release saddle posts, quick-release front and rear lights). To remove the passenger seat, all that is required is that the rail bolts securing the rail-like members of the supporting bracket to the seat tube clamp on the seat tube be loosened. This is accomplished easily, as in the preferred embodiment the rail bolts are hand-operable plastic knobs. The rail-like members will slide out, and the passenger seat can be removed.

Additionally, the present invention allows an easy and rapid switch from a men's style bicycle to a women's style bicycle. For example, if parents are on a long bicycle trip with a child, both bicycles could be provided with a seat tube clamp. When one rider becomes fatigued, all that is required to move the center-mounted passenger seat from the men's style bicycle to the women's style bicycle or vice-versa is that the seat be removed from the men's style bicycle by loosening the rail bolts and withdrawing the rail-like members from the seat tube clamp, the forward support plate be switched from the men's bicycle configuration to the women's bicycle configuration, the rail-like members be inserted into the seat tube clamp of the woman's bicycle and the rail bolts tightened.

A further advantage of the invention is that with the passenger seat disconnected from the bicycle, the supporting bracket provides a means for keeping the passenger seat upright when placed on the ground, which makes the invention particularly useful when the passenger is a child. The passenger seat can thus be used to hold a child before or after the passenger seat is mounted on or removed from the bicycle, respectively; indeed, it can be mounted or removed with the child still strapped in place.

SUMMARY OF THE INVENTION

The general object of the invention is to provide an improved center-mounted passenger seat for bicycle for use interchangeably on most styles and sizes of adult bicycles. Further objects include providing a more stable passenger seat for bicycle, a passenger seat for bicycle easily adjustable to different heights and angles, and an easily removable and re-installable passenger seat for bicycle.

Accordingly, the present invention encompasses a passenger seat mounted between the saddle and handlebars of an adult bicycle, with engagement points with the bicycle frame at the seat tube and the top tube. The passenger seat, which may be of a variety of shapes and materials, in the preferred embodiment comprises a molded plastic child seat further comprising a harness, footwells, padding, and a grab bar. In the preferred embodiment, the footwells comprise plastic enclosures for restraining the passenger's feet to prevent interference with the rider. In the preferred embodiment, the grab bar comprises a removable plastic bar to keep the passenger from sliding forward out of the seat and to prevent him from interfering with the rider. The passenger seat is connected to a supporting bracket by any suitable connecting means, in the preferred embodiment by mounting bolts. To ensure stability, in the preferred embodiment attachment of the passenger seat to the supporting bracket is accomplished by two sets of two mounting bolts. The supporting bracket may be of any suitable construction and in the preferred embodiment includes an angled forward support plate connected to an aft supporting member further comprising a plurality of braces which may be rail-like members.

The supporting bracket is engaged with the seat tube by appropriate connecting means, in the preferred embodiment by rail bolts that secure the rail-like members in openings defined by a seat tube clamp.

The seat tube clamp preferably comprises front and rear halves that are bolted around the seat tube. It is constructed as to accommodate various seat tube dimensions. A gasket made of rubber or any suitable cushioning material protects the seat tube from the seat tube clamp. The seat tube clamp defines openings through which the rail-like members pass. The seat tube clamp is adjustable up and down the seat tube by loosening seat tube clamp bolts which connect the front and rear halves of the seat tube clamp. The rail-like members preferably are secured in the seat tube clamp by hand-operable connecting means such as plastic knobs, screws or rail bolts in the openings of the seat tube clamp, providing for easy height and angle adjustment and easy seat removal. Such adjustment is simple in that the rail-like members can be adjusted readily to different positions in the seat tube clamp and are constructed with sufficient excess length to allow adjustment. Since the forward engagement of the supporting bracket to the top tube of the adult bicycle in the preferred embodiment need only be accomplished by nesting the top tube within the appropriate cutout of the forward support plate, adjustment of the rail-like members in the seat tube clamp or the seat tube clamp along the seat tube are the only adjustments required for repositioning the seat. As the rail-like members are adjusted within the seat tube clamp, the point of contact and support between the forward support plate and the top tube simply slides forward or aft.

The supporting bracket is secured to the horizontal top tube of a men's style bicycle or the downward slanted top tube of a women's style bicycle by suitable connecting means. In the preferred embodiment, this is accomplished by nesting the top tube within an appropriate cutout in the forward support plate of the supporting bracket. Friction, gravity and lateral forces act to help connect the supporting bracket to the top tube. In the preferred embodiment, the forward support plate defines two such cutouts, one for use in connecting the center-mounted passenger seat for bicycle to the horizontal top tube of a men's style bicycle, the other for use in connecting the center-mounted passenger seat for bicycle to the downward-slanted top tube of a women's style bicycle. To change configurations, wing-nuts which connect the forward support plate to the rail-like members are loosened and the forward support plate is removed and repositioned. This enables easy switching from a men's to a women's style bicycle. For example, to switch from the men's bicycle configuration to the women's bicycle configuration, the wing nuts are loosened, the forward support plate, which had been inserted on the forward mounting bolts via the men's bicycle configuration holes, is removed from the forward mounting bolts, rotated 180 degrees, and reinserted on the forward mounting bolts via the women's bicycle configuration holes, and the wing nuts reinstalled. A gasket at the point of contact protects the bicycle frame in either case. Both the men's and women's bicycle cutouts further define notches for passage of brake or derailleur cables.

The center-mounted passenger seat for bicycle can also be used to hold a passenger after removal from the adult bicycle. The supporting bracket resting on the ground holds the passenger seat in a stable and stationary upright position.

Further objects, aspects, and advantages of the invention will become apparent upon review of the following detailed description and accompanying illustrations of the invention, and the claims of the invention.

BRIEF DESCRIPTION OF THE DRAWINGS

For a more complete understanding of the invention, reference should now be made to the embodiment illustrated in the accompanying drawings and described below, wherein like referenced numerals designate like or corresponding parts throughout the several views. In the drawings:

FIG. 5 is a side elevation view of the seat tube clamp;

FIG. 6 is a top view of the seat tube clamp;

FIG. 7 is a side elevation view showing the details of the forward support plate configured for mounting on a women's style bicycle;

FIG. 8 is a side elevation view showing the details of the forward support plate configured for mounting on a men's style bicycle; and FIG. 9 is a top view of the forward support plate.

DETAILED DESCRIPTION OF THE DRAWINGS AND THE PREFERRED EMBODIMENT

Figure 1:
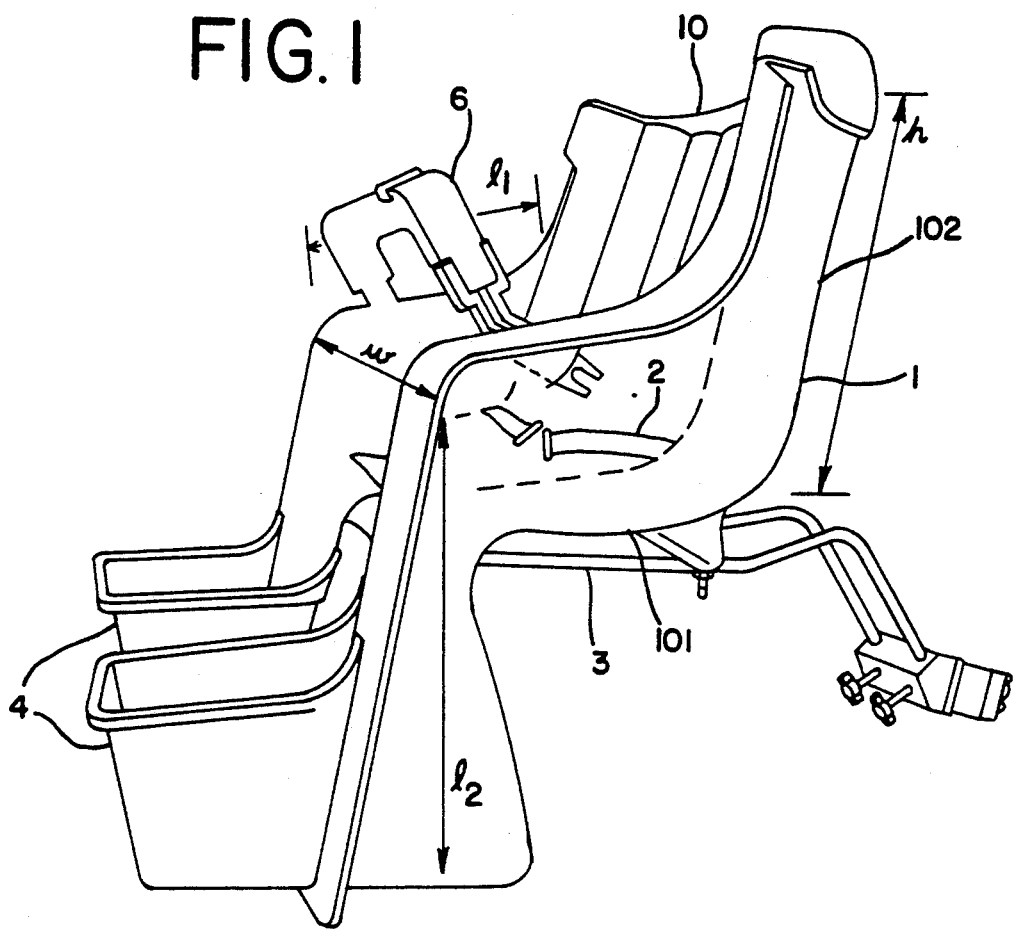
FIG. 1 is a partial cut-away side elevation view of the center-mounted passenger seat for bicycle.

As shown in FIG. 1, a center-mounted passenger seat for bicycle is provided which embodies the invention. Passenger seat 1, which may be of a variety of shapes and designs and is conventionally available in numerous forms and may be made of numerous materials, such as impact resistant polypropylene, is connected by any suitable means to supporting bracket 3. In the preferred embodiment, passenger seat 1 is a child safety seat having a horizontal support member 101 and a seat back 102, and is constructed of impact resistant polypropylene and includes a restraining device such as a harness 2, footwells 4, a grab bar 6, and padding 10. The grab bar, which in the preferred embodiment is a removable swing-away bar constructed of impact resistant polypropylene, adds safety by reducing any tendency of the passenger (such as a small child) to move forward or to attempt to interfere with the rider's control of the handlebars. The footwells, which in the preferred embodiment are box-like enclosures constructed of impact resistance polypropylene, similarly add safety in that they prevent the possibility of the passenger's feet and legs from interfering with the rider.

The passenger seat 1 must be of sufficient size, width, and depth to hold a passenger safely and comfortably, but cannot be so large as to impede the bicycle rider's ability to pedal, steer, see, or otherwise properly operate the bicycle. It has been found that a passenger seat having dimensions h (see FIG. 1), of approximately 10 inches, $l_1$ of approximately 9 inches, $l_2$ of approximately 11 inches, and w of approximately 13 inches adequately achieves the aforementioned goals for carrying a passenger, such as a child, of approximately 50 pounds or less. Obviously, the above dimensions may vary depending on the size of the passenger that is intended to be carried, the size of the bicycle, and individual preferences of the passenger or the rider.

Figure 2:
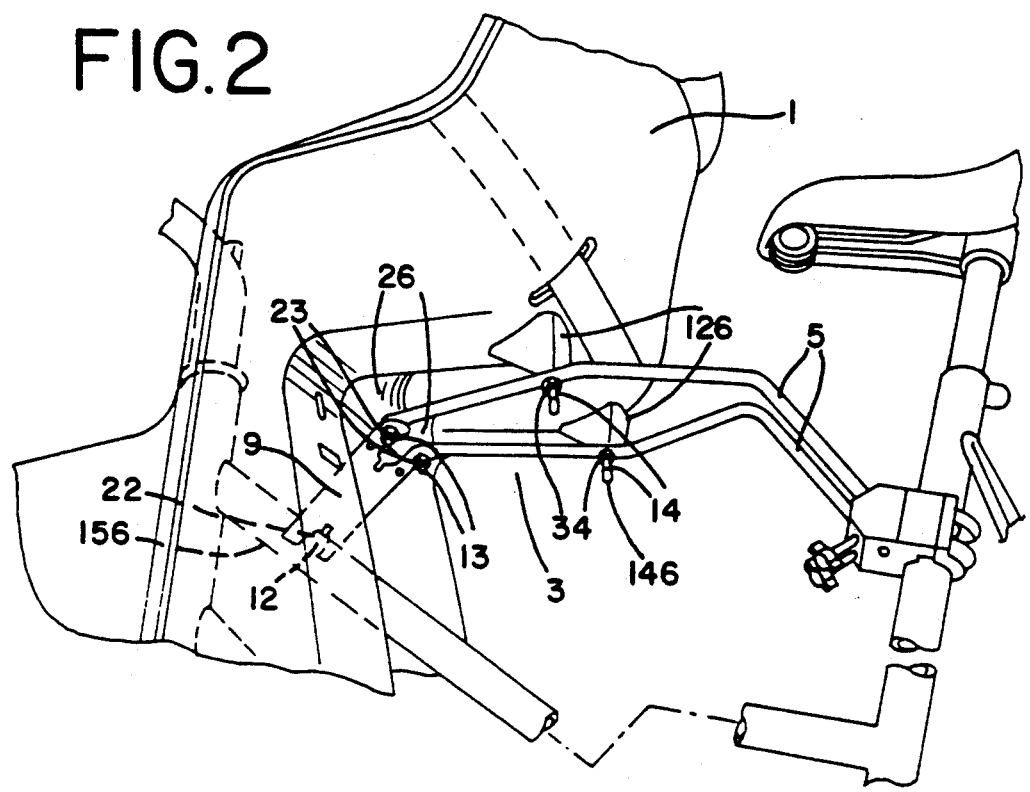
FIG. 2 is a side elevation view of the center-mounted passenger seat for bicycle mounted on a women's style bicycle.

In the preferred embodiment, as shown in FIG. 2, attachment of passenger seat 1 to supporting bracket 3 is made by forward mounting bolts 13, which pass substantially vertically through forward mounting projections 26 of passenger seat 1, rearward-extending rail-like members 5, forward mounting nuts 24 (not shown in this view), forward support plate 9, and forward wing nuts 23; as well as after mounting bolts 14, which pass substantially vertically through after mounting projections 126 of passenger seat 1, rail-like members 5, and after mounting nuts 34. Protective caps 146, which are made of rubber or any suitable material, are provided to cover the ends of the mounting bolts.

Figure 4:
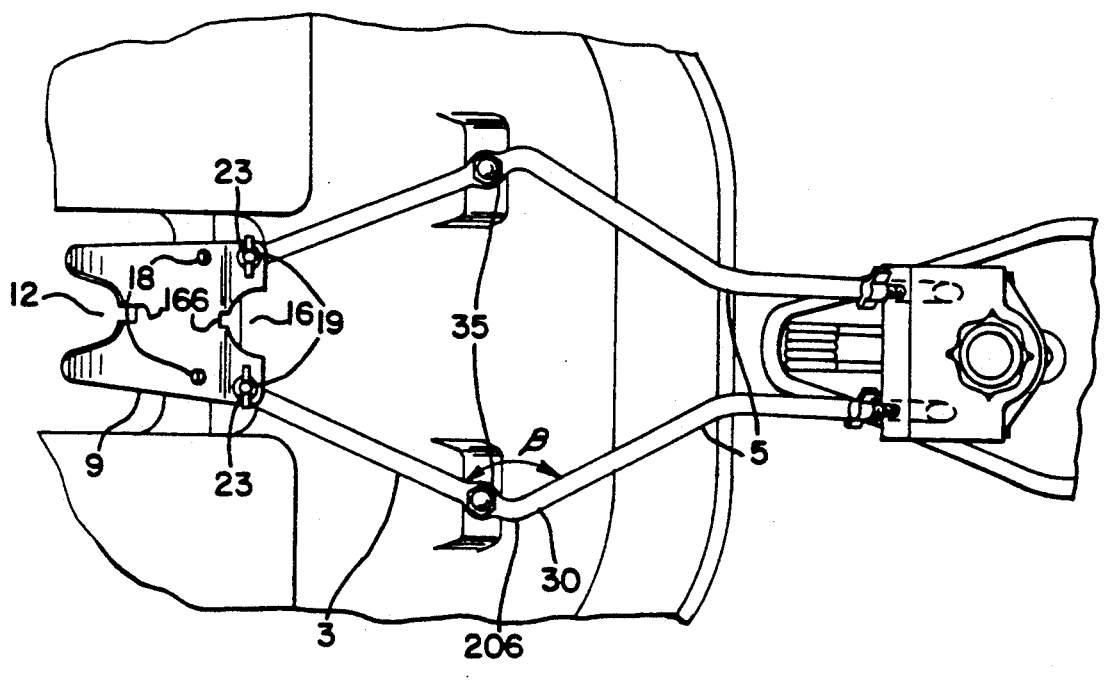
FIG. 4 is a bottom view of the center-mounted passenger seat for bicycle showing the supporting bracket in detail.

Supporting bracket 3 may be of any suitable construction, and may be of unitary or multiple component construction; however, in the preferred embodiment, supporting bracket 3, as shown in more detail in FIG. 4, has aft supporting member 30 which comprises rearward-extending rail-like members 5 that function as braces, which define after mounting bolt holes 35, together with forward support plate 9, which defines women's bicycle cutout 12, men's bicycle cutout 16, women's bicycle configuration holes 19, men's bicycle configuration holes 18, and cable notches 166. The cable notches are provided for the passage of brake or derailleur cables through the forward support plate.

Figure 3:
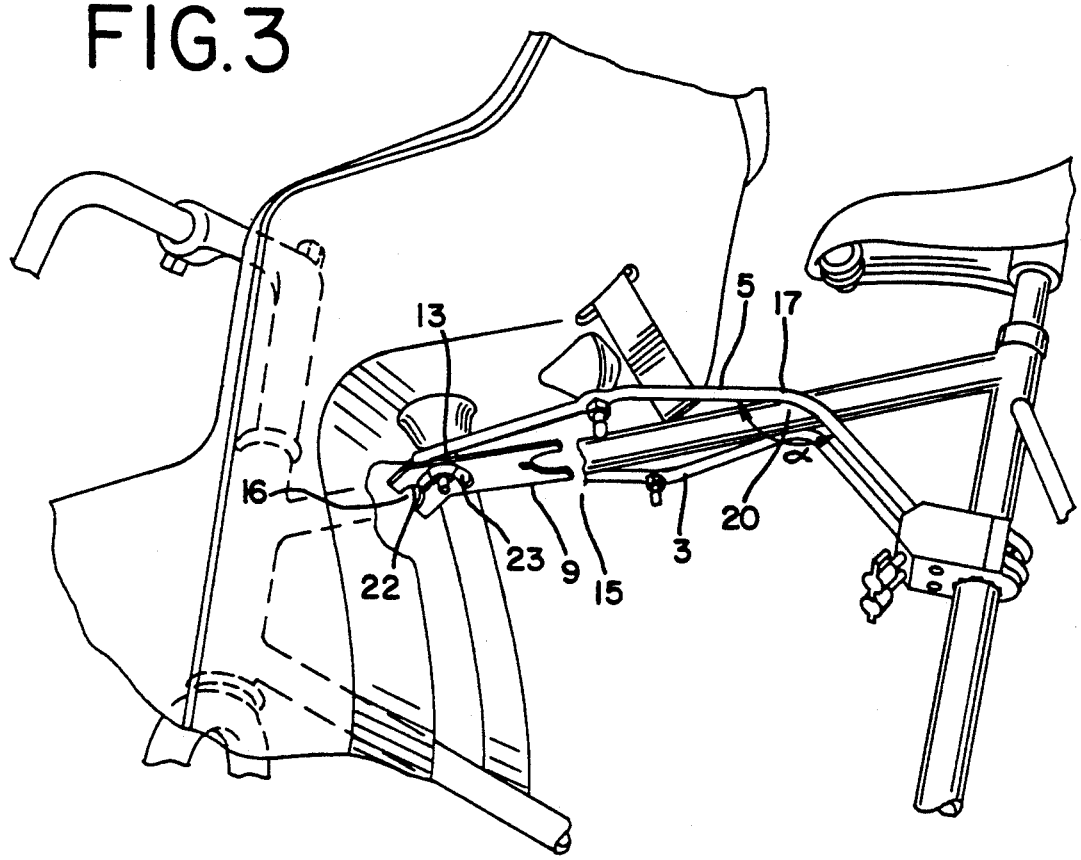
FIG. 3 is a side elevation view of the center-mounted passenger seat for bicycle mounted on a men's style bicycle.

Forward support plate 9 is secured to the rail-like members 5 by any suitable means, in the preferred embodiment by forward mounting bolts 13 and forward wing nuts 23. Rail-like members 5 and forward support plate 9 may be constructed of any suitable material. In the preferred embodiment the rail-like members are made from steel rods and the forward support plate is made from steel. Any appropriate lightweight, sturdy metal or metal alloy will suffice, however, for these components. Rail-like members 5 may be of any appropriate geometry, however, in the preferred embodiment, as seen in FIG. 3 and FIG. 4, the rail-like members 5 are fashioned with two distinct bends. Bend 20, as seen in FIG. 3, is in a direction substantially normal from an imaginary plane substantially parallel to the horizontal support member of the passenger seat, and adds stability due to its ability to absorb shock, as well as adding versatility, flexibility, adaptability to different bicycle frames, and providing a pleasing appearance. In the preferred embodiment, bend 20 defines an angle α of approximately 120 degrees. In the preferred embodiment, rail-like members 5 also define a shallow bend 206 (as seen in FIG. 4) in a direction normal to an imaginary vertical plane bisecting the saddle and defining an angle β, with the vertex of the angle just behind the after mounting bolt holes of the rail-like members. In addition to providing a broader supporting base for the passenger seat, bend 206 provides similar advantages to the overall invention as bend 20, except in a different plane of motion. In the preferred embodiment, angle β is approximately 120 degrees. In the preferred embodiment, the rail-like members 5 are approximately 1.5 feet in length. They are constructed with sufficient excess length to allow for adjustments of the center-mounted passenger seat for bicycle to different heights and angles on the adult bicycle. It is to be understood that the supporting bracket in other embodiments can be made of one or more pieces, or from different types of braces, rather than from separate rail-like members connected to a forward support plate, as in the preferred embodiment. The particular configuration chosen can be of any suitable geometry and include components of any suitable dimensions and that define any suitable angles.

At location 17 of FIG. 3 rail-like members 5 can be seen to pass to either side of an imaginary substantially vertical plane simultaneously intersecting the head tube, top tube, and seat of a men's style bicycle. This rail-like construction of the invention, in addition to adding stability to the passenger seat, allows use of the invention on both men's and women's style bicycles and provides for easy height and angle adjustment for the passenger seat assembly. The interchangeability afforded by the rail-like construction can be achieved by other ways in other embodiments, such as providing a notch or a cutout in the after end of a supporting bracket, through which the top tube of a men's style bicycle could pass.

Turning attention now to FIG. 5 and FIG. 6, it can be seen that aft supporting member 30 of supporting bracket 3 is connected to seat tube 7. This connection may be made by any suitable means. In the preferred embodiment, rail-like members 5 are held in rail holes 33 defined by forward clamp half 29 of seat tube clamp 11, which is clamped around seat tube 7. Forward clamp half 29 and rear clamp half 25 are connected by appropriate means, in the preferred embodiment by seat tube clamp bolts 27 which are threaded into threaded openings 32 in the forward clamp half 29. This allows the seat tube clamp to be mounted on seat tubes of various dimensions. In the preferred embodiment, seat tube clamp bolts 27 are allen-type bolts. Seat tube gasket 8 protects the seat tube, and is made of rubber or any suitable cushioning material.

Seat tube clamp 11 may be constructed of any suitable material and may be mounted around the seat tube by any suitable means. In the preferred embodiment, seat tube clamp 11 is cast from a lightweight metal or metal alloy such as aluminum. It may also be stamped or injected molded, and may be made from any suitable material. By tightening and loosening seat tube clamp bolts 27, the height of seat tube clamp 11 can be adjusted, positioning seat tube clamp 11 at various heights along seat tube 7 and adjusting passenger seat 1 to various angles. As the height of seat tube clamp 11 along seat tube 7 changes, rail-like members 5 can be repositioned within seat tube clamp 11, changing the point at which forward support plate 9 contacts top tube (men's) 15 or top tube (women's) 156. The rail-like members have sufficient excess length to allow this repositioning.

Rail-like members 5 can be secured to seat tube clamp 11 by any suitable connecting means; however, in the preferred embodiment, this connection is made by inserting rail-like members 5 into rail holes 33. Rail bolts 31, which in the preferred embodiment are hand-operable plastic knobs enabling quick release without tools, are threaded through threaded openings 32 until they meet the rail-like members 5 in an interference fit. Rail-like members 5 pass through rail holes 33 in seat tube clamp 11, and are secured in an interference fit by rail bolts 31. In the preferred embodiment, (as shown in FIG. 5) angle $\Delta$, the angle between the rail holes and the down tube, is approximately 60°. By tightening rail bolts 31, rail-like members 5 are held in place. By tightening and loosening rail bolts 31, the height and angle of passenger seat 1 can be changed easily. Additionally, the entire supporting bracket 3 and passenger seat 1 may be removed by loosening rail bolts 31 and pulling rail-like members 5 entirely out of seat tube clamp 11 so that the bicycle can convert easily to a bicycle without a passenger seat.

The forward end of supporting bracket 3 engages the top tube of the adult bicycle by any suitable means. In the preferred embodiment, as shown in FIG. 2, an angled forward support plate 9 rests on slanted top tube (women's) 156 of a women's bicycle, women's bicycle cutout 12 nesting around top tube (women's) 156. Top tube gasket 22 prevents damage to the finish of top tube (women's) 156, and may be of rubber or any suitable cushioning material. In the preferred embodiment, forward support plate 9 engages the top tube solely by a snug fit between women's cutout 12 and top tube (women's) 156. Friction, lateral forces, and gravity maintain the connection between the forward support plate and the top tube. Forward support plate 9 may be of any suitable material or shape.

While the dimensions of the forward support plate may vary, in the preferred embodiment the forward support plate is approximately 5 inches long by 2.5 to 3 inches wide, and is ⅛ of an inch thick. The portion of the forward support plate defining the men's bicycle cutout is approximately 0.5 inches long and the portion of the forward support plate defining the women's bicycle cutout is approximately 2 inches long. The men's bicycle cutout is a semi-circle of about 1 inch in radius, and the women's bicycle cutout an elongated semi-circle of about 1.5 inches in radius. Both cutouts define notches for the passage of brake and derailleur cables. The angle $\phi$ of the forward support plate (as seen in FIG. 8) in the preferred embodiment is approximately 135°. In the preferred embodiment, forward support plate 9 is cut out or stamped from a suitable material such as flat sheet metal of a lightweight sturdy metal alloy such as aluminum.

As shown in FIG. 3, passenger seat 1 also is adapted for use on a men's style bicycle, in which case forward support plate 9 nests on horizontal top tube (men's) 15 at men's bicycle cutout 16. Top tube gasket 22 is similarly provided to protect the finish of top tube (men's) 15.

The point of contact between the forward mounting plate and the top tube of either a men's or a women's style bicycle will obviously vary depending on the size of the bicycle and the preference of the rider and the passenger as to angle and height. In the preferred embodiment, the point of contact is approximately 5 inches from the head tube in either case.

The two configurations of the forward support plate are shown in more detail in FIG. 7, FIG. 8, and FIG. 9. FIG. 7 shows the women's style bicycle configuration of forward support plate 9. Women's bicycle cutout 12 rests on top tube (women's) 156. Forward mounting bolts 13 pass from mounting projections 26, through rail-like member 5, forward mounting bolts 24, women's configuration holes 19 of forward support plate 9, and forward wing nuts 23. To configure forward support plate 9 for a men's style bicycle, as shown in FIG. 8, forward wing nuts 23 are removed, forward support plate 9 is removed, rotated 180 degrees, and reinserted on forward mounting bolts 13 through men's configuration holes 18, and secured by forward wing nuts 23. Men's bicycle cutout 16 then nests on top tube (men's) 15. FIG. 9 shows the forward support plate in detail, including cable notches 166. The present invention thus allows the rapid switch of the center-mounted passenger seat from a women's style to a men's style bicycle. Thus, for example, if parents are on a long bicycle trip with a child, both bicycles could be provided with a seat tube clamp. When one rider became fatigued, the center-mounted passenger seat could be switched from the men's to the women's style bicycle, or vice versa.

While particular embodiments of the invention have been described above, the invention is not so limited. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

What is claimed is:

1. A seat adapted to carry a passenger between the saddle and handlebars of a bicycle comprising:
   means for carrying the passenger;
   a bracket connected to said means for carrying the passenger, said bracket comprising a forward support plate connected to a plurality of rail-like members, said forward support plate comprising a cutout for nesting engagement with the top tube of a men's style bicycle and a cutout for nesting engagement with the top tube of a women's style bicycle;
   means for engaging said bracket with the seat tube of the bicycle; and
   means for engaging said bracket with the top tube of the bicycle.

2. A seat adapted to carry a passenger between the saddle and handlebars of a bicycle comprising:
   a passenger seat comprising a substantially horizontal support member and a substantially vertical seat back;
   a plurality of rail-like members;
   a seat tube clamp for engagement with the seat tube of the bicycle wherein said seat tube clamp comprises openings for the passage of said rail-like members;
   a forward support plate for engagement with the top tube of the bicycle;
   means for connecting said rail-like members either to said passenger seat, to said forward support plate, or to both;
   means for connecting said passenger seat either to said rail-like members, to said forward support plate, or to both;
   means for connecting said rail-like members to said seat tube clamp; and
   means for connecting said forward support plate to said rail-like members, to said passenger seat, or to both.

3. The seat of claim 2 wherein said rail-like members are secured in said openings by hand-operable means.

4. A seat adapted to carry a passenger between the saddle and handlebars of a bicycle comprising:
   a passenger seat comprising a substantially horizontal support member and substantially vertical seat back;
   a seat tube clamp for engagement with the seat tube of the bicycle;
   a plurality of rail-like members;
   a forward support plate for engagement with the top tube of the bicycle wherein said forward support plate comprises a cutout adapted for nesting engagement with the top tube of a men's style bicycle and a cutout for nesting engagement with the top tube of a women's style bicycle;
   means for connecting said rail-like members to either said passenger seat, to said forward support plate, or to both;
   means for connecting said passenger seat either to said rail-like members, to said forward support plate, or to both;
   means for connecting said rail-like members to said seat tube clamp; and
   means for connecting said forward support plate to said rail-like members, to said passenger seat, or to both.

5. A seat adapted to carry a passenger between the saddle and handlebars of a bicycle comprising:
   a passenger seat comprising a horizontal support member and a seat back;
   a forward support plate comprising a cutout adapted for nesting engagement with the top tube of a men's style bicycle and a cutout adapted for nesting engagement with the top tube of a women's style bicycle;
   an aft supporting member comprising a plurality of braces, with at least one of said braces adapted to be located on one side of an imaginary substantially vertical plane simultaneously intersecting the head tube, top tube, and seat of the bicycle and with at least one other of said braces adapted to be located on the other side of said plane;
   an adjustable seat tube clamp that comprises adjustable clamping means for connecting to the seat tube of the bicycle that can be raised or lowered along said seat tube and that further comprises means for connection with said braces of said aft support member;
   means for connecting said passenger seat either to said forward support plate, to said aft supporting member, or to both;
   means for connecting said aft supporting member either to said passenger seat, to said forward support plate, or to both;
   means for connecting said forward support plate either to said passenger seat, to said aft supporting member, or to both; and
   means for connecting said forward support plate to said rail-like members, to said passenger seat, or to both.

6. The seat of any one of claims 14 wherein said seat further comprises a harness for securing the passenger in said seat, footwells, and a grab bar.

* * * * *